US009204195B2

(12) United States Patent
Hickmann et al.

(10) Patent No.: US 9,204,195 B2
(45) Date of Patent: Dec. 1, 2015

(54) SYSTEMS AND METHODS FOR PROVIDING LIVE ACTION REWARDS

(71) Applicant: Kwarter, Inc., San Francisco, CA (US)

(72) Inventors: Sam Hickmann, San Francisco, CA (US); Carlos Diaz, San Francisco, CA (US)

(73) Assignee: KWARTER, INC., San Francisco, CA (US)

( * ) Notice: Subject to any disclaimer, the term of this patent is extended or adjusted under 35 U.S.C. 154(b) by 44 days.

(21) Appl. No.: 13/864,493

(22) Filed: Apr. 17, 2013

(65) Prior Publication Data

US 2013/0276014 A1   Oct. 17, 2013

Related U.S. Application Data

(60) Provisional application No. 61/625,593, filed on Apr. 17, 2012.

(51) Int. Cl.
| | |
|---|---|
| *H04N 21/4784* | (2011.01) |
| *H04N 21/2187* | (2011.01) |
| *H04N 21/414* | (2011.01) |
| *H04N 21/431* | (2011.01) |
| *H04N 21/472* | (2011.01) |
| *H04N 21/81* | (2011.01) |

(52) U.S. Cl.
CPC ....... *H04N 21/4784* (2013.01); *H04N 21/2187* (2013.01); *H04N 21/41407* (2013.01); *H04N 21/431* (2013.01); *H04N 21/47205* (2013.01); *H04N 21/812* (2013.01)

(58) Field of Classification Search
CPC .......................... H04N 21/81; H04N 21/4784
USPC .......................................................... 725/23
See application file for complete search history.

(56) References Cited

U.S. PATENT DOCUMENTS

| | | | |
|---|---|---|---|
| 7,577,978 B1* | 8/2009 | Wistendahl et al. | .......... 725/113 |
| 2009/0089838 A1 | 4/2009 | Pino, Jr. et al. | |
| 2009/0138904 A1 | 5/2009 | Kitsukawa et al. | |
| 2011/0004898 A1 | 1/2011 | Ritter et al. | |
| 2011/0107363 A1* | 5/2011 | Sanghavi | .......... 725/23 |
| 2011/0202950 A1 | 8/2011 | Stougaard | |
| 2012/0272278 A1* | 10/2012 | Bedi | .......... 725/105 |
| 2013/0222597 A1* | 8/2013 | Brink et al. | .......... 348/157 |

OTHER PUBLICATIONS

International Search Report; International Appln. No. PCT/US2013/036966, Jun. 20, 2013.

\* cited by examiner

*Primary Examiner* — Jefferey Harold
*Assistant Examiner* — Justin Sanders
(74) *Attorney, Agent, or Firm* — Orrick, Herrington & Sutcliffe LLP

(57) ABSTRACT

Systems and methods for use in games and entertainment systems are provided. The present system produces items for capture on one or more user devices that are triggered by live events. As an example, live events include, but are not limited to sporting events (e.g., football games, basketball games, rounds of golf, tennis matches), political debates, television shows, dramas, and other viewable events. The user of the user device is challenged to capture the correct item at the right moment. If the capture is successful, the user receives a reward.

18 Claims, 8 Drawing Sheets

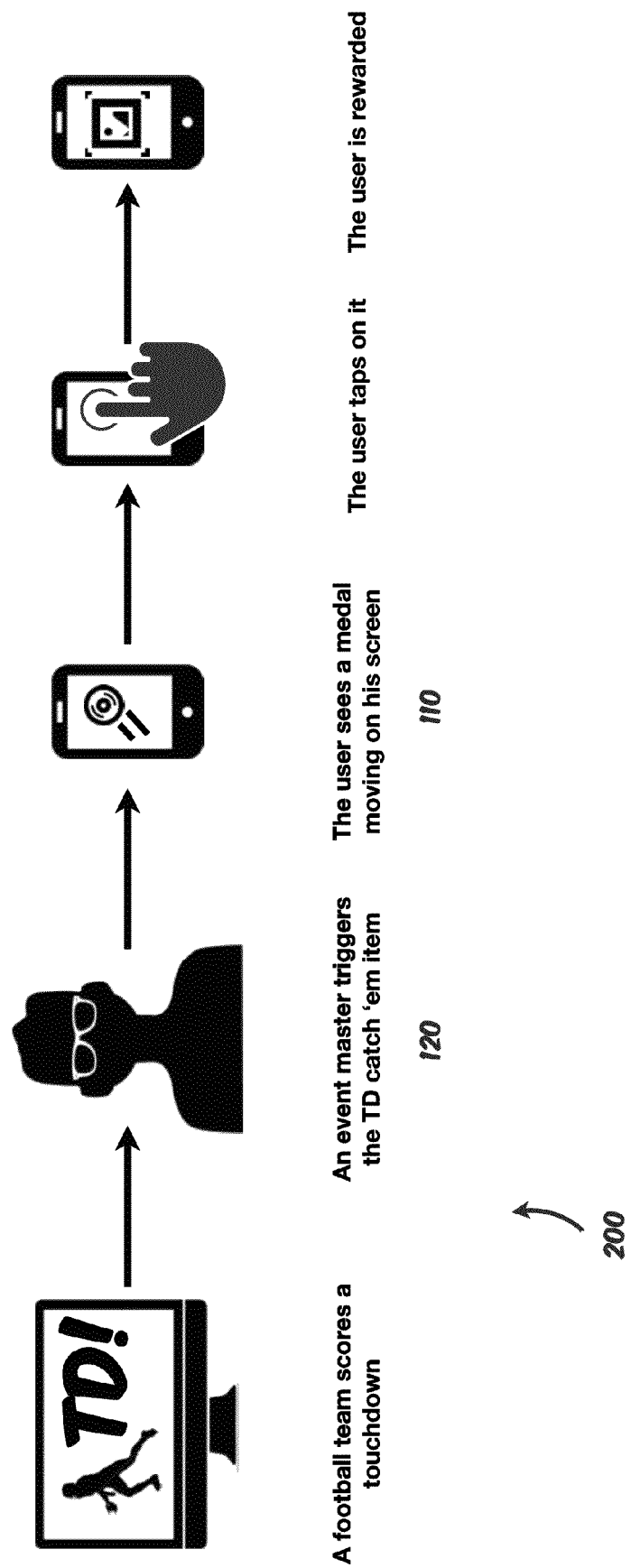

SYSTEMS AND METHODS FOR PROVIDING LIVE ACTION REWARDS

FIELD

The present disclosure relates generally to computer systems and, more particularly, but not exclusively, to systems and methods for live action rewards.

BACKGROUND

The broadcasting of TV shows, sports events, news, etc. is the coverage of an event through television, radio, on-line streaming, and other broadcasting media. Typically, viewers of these broadcast events are passive watchers having minimal opportunity to actively engage in the broadcast events.

Accordingly, a need exists for broadcasters to turn passive watchers into engaged users. An engaged user is a user that interacts, or actively participates, with the broadcast content being presented. This interaction and active participation encourages users to spend more time viewing the broadcast events, thereby introducing both entertainment and reward opportunities to the user.

BRIEF DESCRIPTION OF THE DRAWINGS

The accompanying drawings illustrate certain preferred embodiments and are not intended to limit the invention. Together with the general description given above and the detailed description of the preferred embodiments given below, these drawings serve to explain and illustrate the principles of the present disclosure.

FIG. 2C illustrates an exemplary reward sequence for use with the rewards system of FIG. 1, according to one embodiment.

Figure 1:
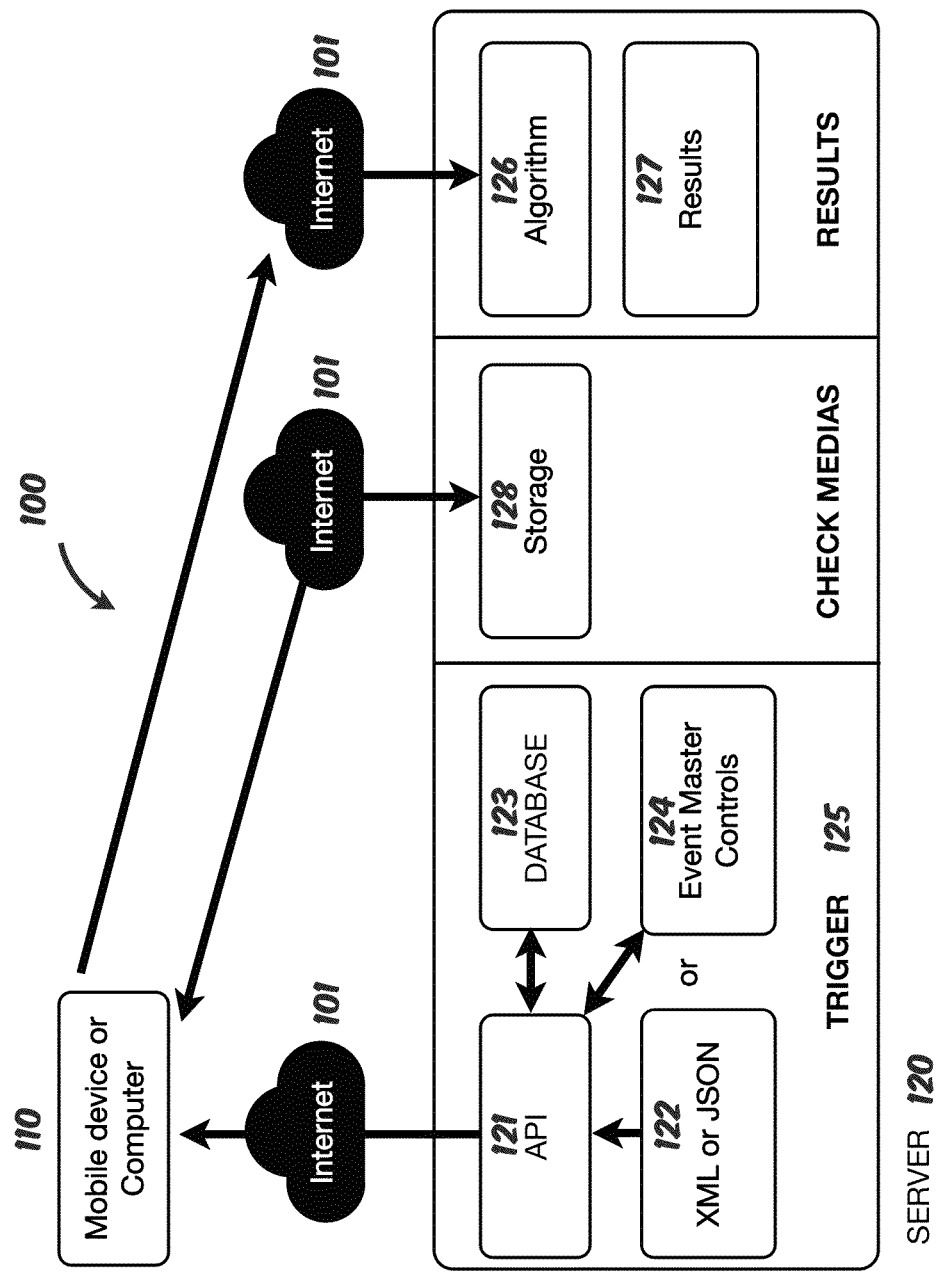
FIG. 1 illustrates an exemplary system level architecture of a rewards system for use with the present disclosure, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not necessarily describe every aspect of the teachings disclosed herein and do not limit the scope of the claims.

DETAILED DESCRIPTION

In a preferred embodiment, the present disclosure includes systems and methods for use in games and entertainment systems. The present system produces items for capture that are triggered by live events. As an example, live events include, but are not limited to, sporting events (e.g., football games, basketball games, rounds of golf, tennis matches), political debates, television shows, dramas, and other viewable events.

In one embodiment, the items for capture are triggered during key moments directly linked to the live events. As will be described below in further detail, key moments directly linked to the live events include, but are not limited to, converting a "three-pointer" in basketball, making a "double-play" in baseball, and scoring a goal in soccer.

According to one embodiment, the items for capture of the present system are contextual objects that move over a display (or user interface) of an electronic device. The user of the electronic device is challenged to capture the correct item at the right moment. If the capture is successful, the user receives a reward.

In another embodiment, capturing a selected item to receive the reward comprises moving the pointer of a mouse over the selected item for capture and clicking within a designated (or predetermined) time limit. In other embodiments, capturing the selected item comprises performing a particular pattern of keystrokes, performing a single keystroke, and/or tapping a touch screen device (e.g., an iPad®, iPhone®, or other touch screen enabled device).

FIG. 1 illustrates an exemplary system level architecture of a rewards system 100 for use with the present disclosure, according to one embodiment. The rewards system 100 is shown to include at least one mobile (or user) device 110 in communication with a server 120 over a data network 101, such as the Internet. Although illustrated as the Internet, one of ordinary skill in the art would appreciate that the data network 101 may include one or more Local Area Networks ("LANs"), a Wide Area Network ("WAN") (e.g., Internet Protocol ("IP") network), and/or mobile/cellular wireless networks connected to one another. Communication/data exchange over data network 101 may occur via any common high-level protocols (e.g., Transfer Control Protocol ("TCP")/IP, User Datagram Protocol ("UDP"), and so on) and may comprise differing protocols of multiple networks connected through appropriate gateways. This communication/data exchange supports both wired and wireless connections.

In a preferred embodiment, the mobile (or user) devices 110 are personal computing devices configured to connect to the data network 101, such as tablets or smart phones. However, the mobile devices 110 can include other computing devices such as video game consoles, laptops, personal digital assistants (PDAs), set-top boxes, and so on.

Similarly, the server 120 may be any computing device configured to communicate over data network 101. Exemplary computer architecture for both server 120 and mobile device 110 will be described in further detail below, with reference to FIG. 4.

Figure 6:
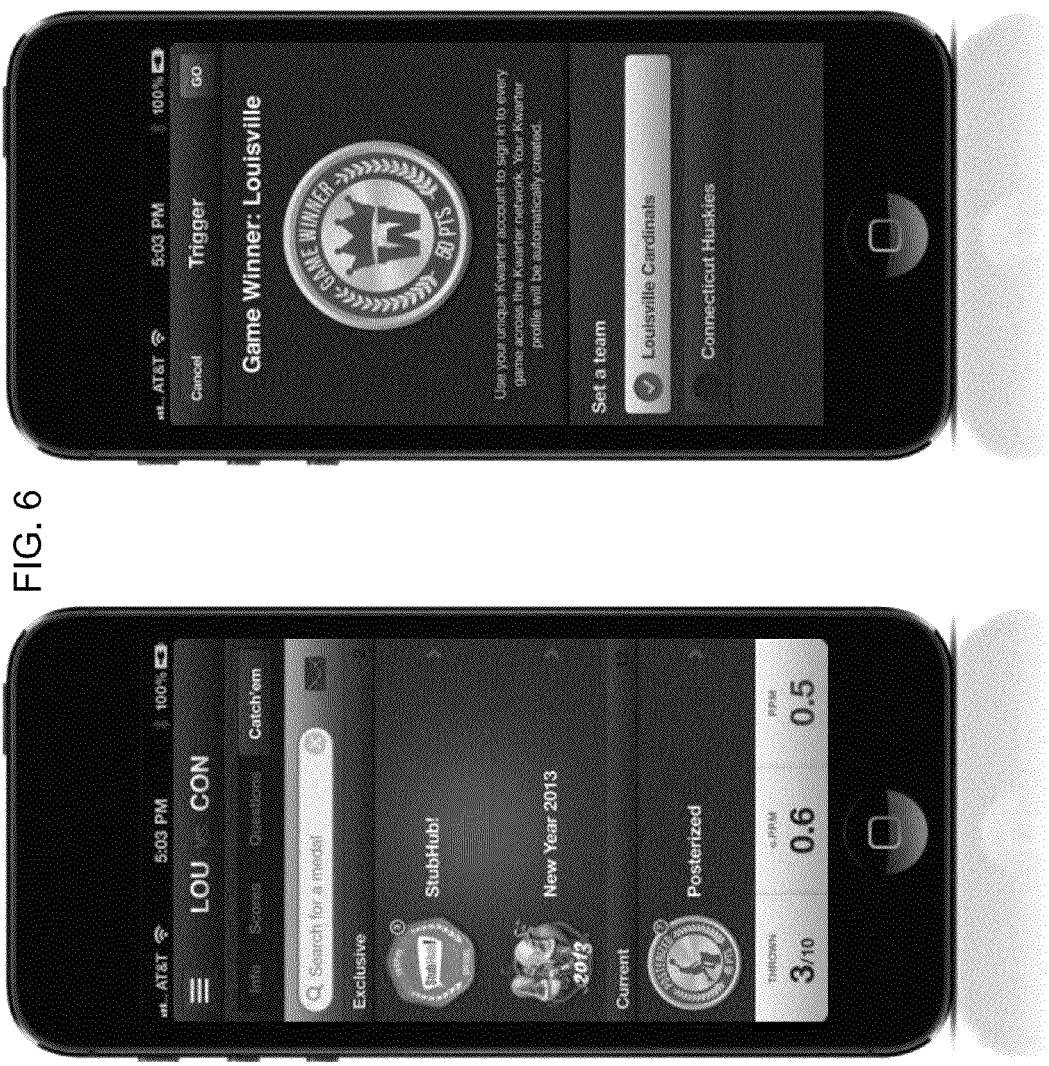
FIG. 6 illustrates an exemplary screenshot of event master controls illustrated in FIG. 1 for triggering a rewards sequence according to one embodiment.

The server 120 is shown to include a trigger system 125 having an application programming interface (API) 121 for allowing other programs to connect to the rewards system 100 and trigger items for capture. The items for capture can be triggered manually and/or automatically. For manual triggering, the trigger system 125 includes event master (or back office) controls 124. The event master controls 124 (an example screenshot of these controls on a mobile device 110 is shown in FIG. 6), via the API 121, allows an event master (i.e., a specific authorized user) to trigger a selected item for capture. For automatic triggering, the trigger system 125 is configured to exchange data with external sources 122 and process any incoming triggering calls. In one embodiment, trigger system 125 transmits structured triggering data/feeds in real-time between the external sources 122 and server 120 using a JavaScript Object Notation (JSON) and/or Extensible Markup Language (XML) standards. These standards serialize and transmit structured data/feeds over data network 101, via the API 121.

Figure 2A:
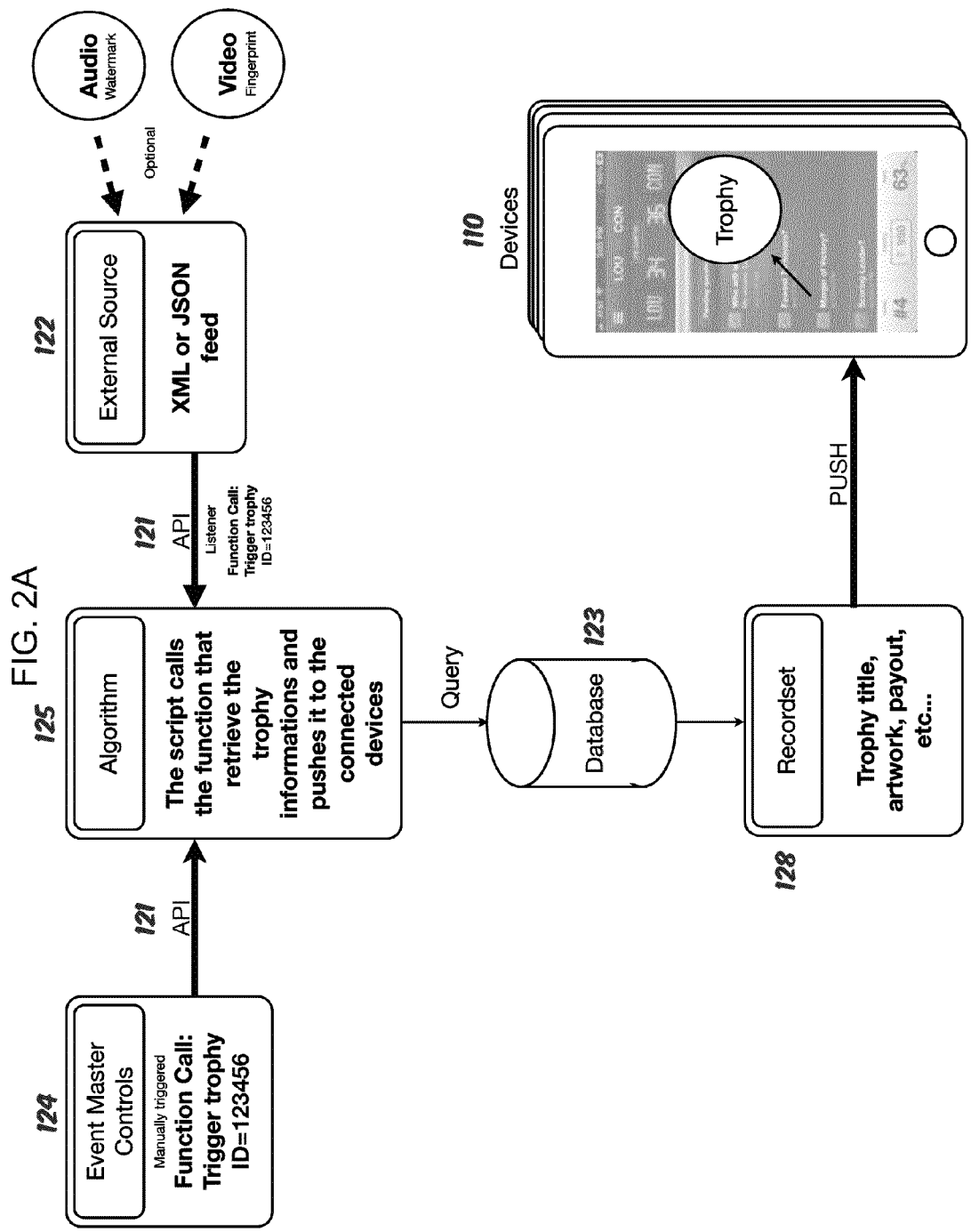
FIG. 2A illustrates an exemplary interaction with the trigger system of FIG. 1.

As an example, turning to FIG. 2A, interaction with trigger system 125 is shown. As illustrated, the trigger system 125 receives triggering calls from event master controls 124 and/or external sources 122 via API 121. As previously mentioned, these triggering calls include predefined triggering conditions based on key moments directly linked to the live events. For example, an event master may trigger a rewards sequence following a homerun in a live baseball game. Alternatively, as shown in FIG. 2A, predefined triggering conditions may automatically trigger a rewards sequence based on video and/or sound at a live event (e.g., if a mobile device 110 receives noise levels at a stadium for longer than 10 seconds, the rewards sequence is started).

Once the trigger system 125 receives the triggering calls, the server 120 queries a database 123, which is used to store reward variables and rules including, but not limited to, the triggering conditions, trophy information, connected devices 110, trophy title, artwork, payouts, and so on. However, it should be understood that these reward variables and rules are not limited to storage in database 123 and may be stored on a storage database 128, results database 127, and/or the mobile device 110. In one example, triggering conditions stored in database 123 include a set of rules that associates events, actions, and rewards to determine the appropriate moment to trigger an item for capture. For instance, for the event ID=123 (i.e., a baseball game), if action ID=345 (i.e., home team hits a homerun) occurs, then trigger system 125 triggers item ID=678 (e.g., a contextual item for capture that represents an image of a beer on the user display and, when caught, can be redeemed for a free beer for selected participants). Therefore, when the triggering calls are received from external sources 122 (e.g., a live XML and/or JSON feed), human intervention is not required to trigger a selected item for capture.

According to one embodiment, the rewards system 100 provides for a layer (shown in FIG. 5) to be overlaid on content of the user interface. The layer disables buttons, links, or other interactions by the user, except for the ability to tap on a moving item for capture during a limited amount of time. The moving item for capture is made of exemplary parameters including direction/path, acceleration, duration, artwork, and sounds, according to one embodiment.

According to another embodiment, capturing an item comprises making a gesture within predetermined parameters that define how the user interacts with the item. Predefined parameters include, for example, a type of catch and a duration of time within which a catch will be valid. In one example, the type of catch includes, among others, a click with a mouse, a tap with the mouse, a circle around the item with the mouse, or an 'X' over the item with the mouse.

Figure 2B:
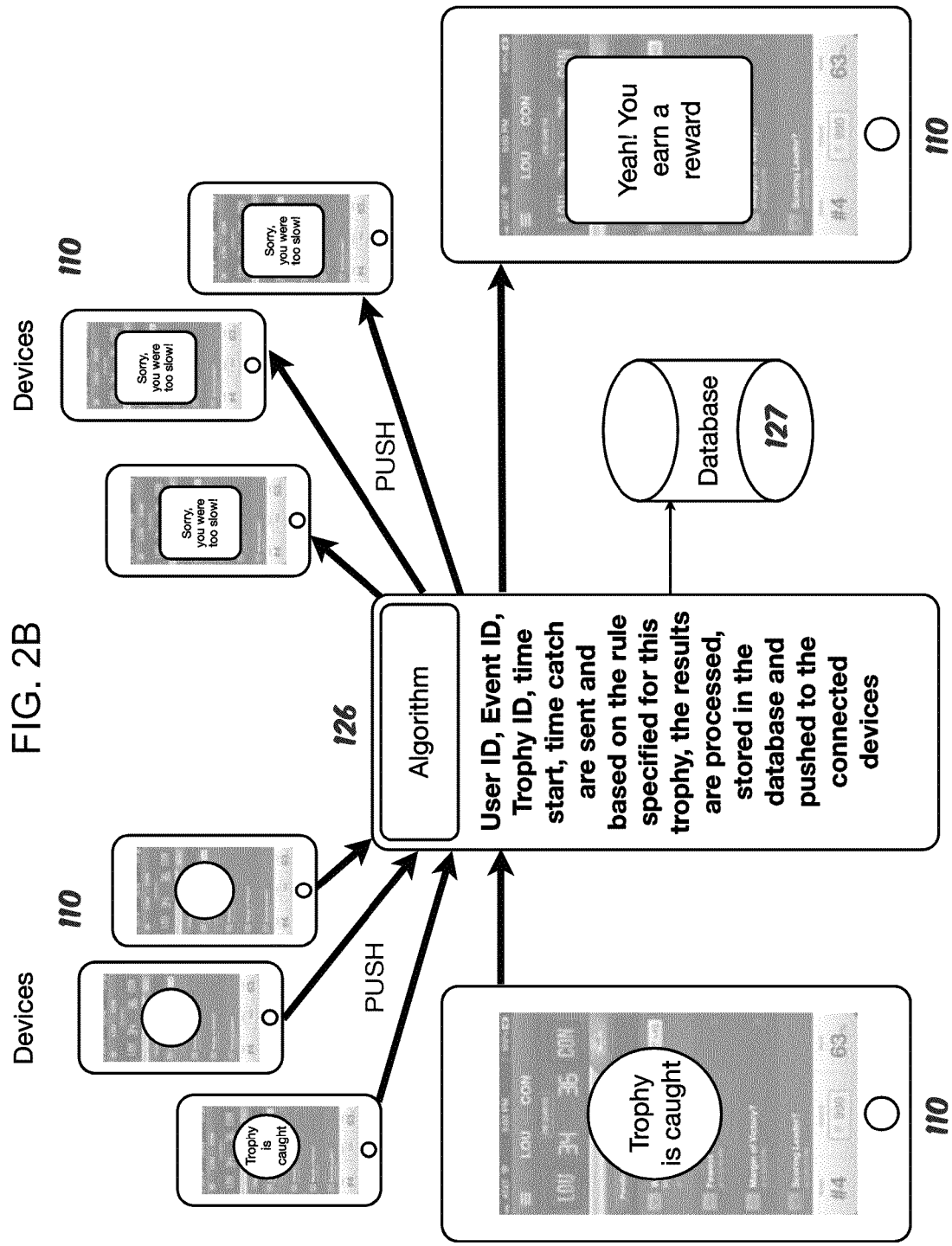
FIG. 2B illustrates an exemplary flow of reward calculations for use with the rewards system of FIG. 1.

With reference to FIG. 1, to determine results of capturing the items and to display them to the winners, the rewards system 100 analyzes data and compares it to the rules defined by a system administrator (rewards algorithm 126). The rules are defined by parameters such as type of game, number of winners, and time ranges for valid capture items. For example, turning to FIG. 2B, determining the results of a rewards game is shown. As illustrated, the mobile devices 110 connected to the game each push their respective user ID, event ID, trophy ID, time the game started, and the time of capturing the selected item to the server 120. Server 120 receives this information and based on a specific rule for this event (e.g., first user to capture the reward under 10 seconds), selects a mobile device 110 defined by the specific rule to earn the reward and stores the results in the results database 127 of server 120.

Returning to FIG. 1, the server 120 additionally includes the database 128 that can be used to store rewards information (e.g., trophy artwork discussed above). In a preferred embodiment, database 128 includes a cloud computing data storage device such that rewards information, rules, and so on can be accessible over a wide area via data network 101. However, database 128, database 123, and results database 127 can include other storage mediums that can be read by a computer system including, but not limited to, magnetic disks, hard drives, network attached storage, read-only memory, random-access memory, CD-ROMs, optical storage devices, and so on. Similarly, database 128, database 123, and results database 127 can each reside on one or more servers 120 or separate computing components in communication with one another.

Figure 5:
FIG. 5 illustrates an exemplary screenshot of the rewards system illustrated in FIG. 1.
Figure 5:

Turning to FIG. 2C, an exemplary reward sequence 200 for use with the rewards system 100 is shown according to one embodiment. As illustrated, a game master (e.g., via event master controls 124) triggers selected items for capture upon the occurrence of a live action event (e.g., a football team scoring a touchdown). Subsequently, users (e.g., via their mobile device 110) are presented with the selected items for capture (such as illustrated in FIG. 5) and participate in the rewards program by performing one of the capturing events, described above.

In one embodiment, the rewards system 100 provides an equal opportunity for each participant (e.g., via mobile devices 110) to earn rewards by sending the items for capture to all participants using mobile devices 110 for the same duration. Specifically, rewards system 100 handles any delay introduced by different data networks 101 used (e.g., 3G, 4G, Wi-Fi, Ethernet). For example, FIG. 3 illustrates exemplary timing diagrams 300 for use with the rewards system 100 to ensure that each participant on their mobile device 110 has the same opportunity to earn rewards, according to one embodiment.

Figure 3:
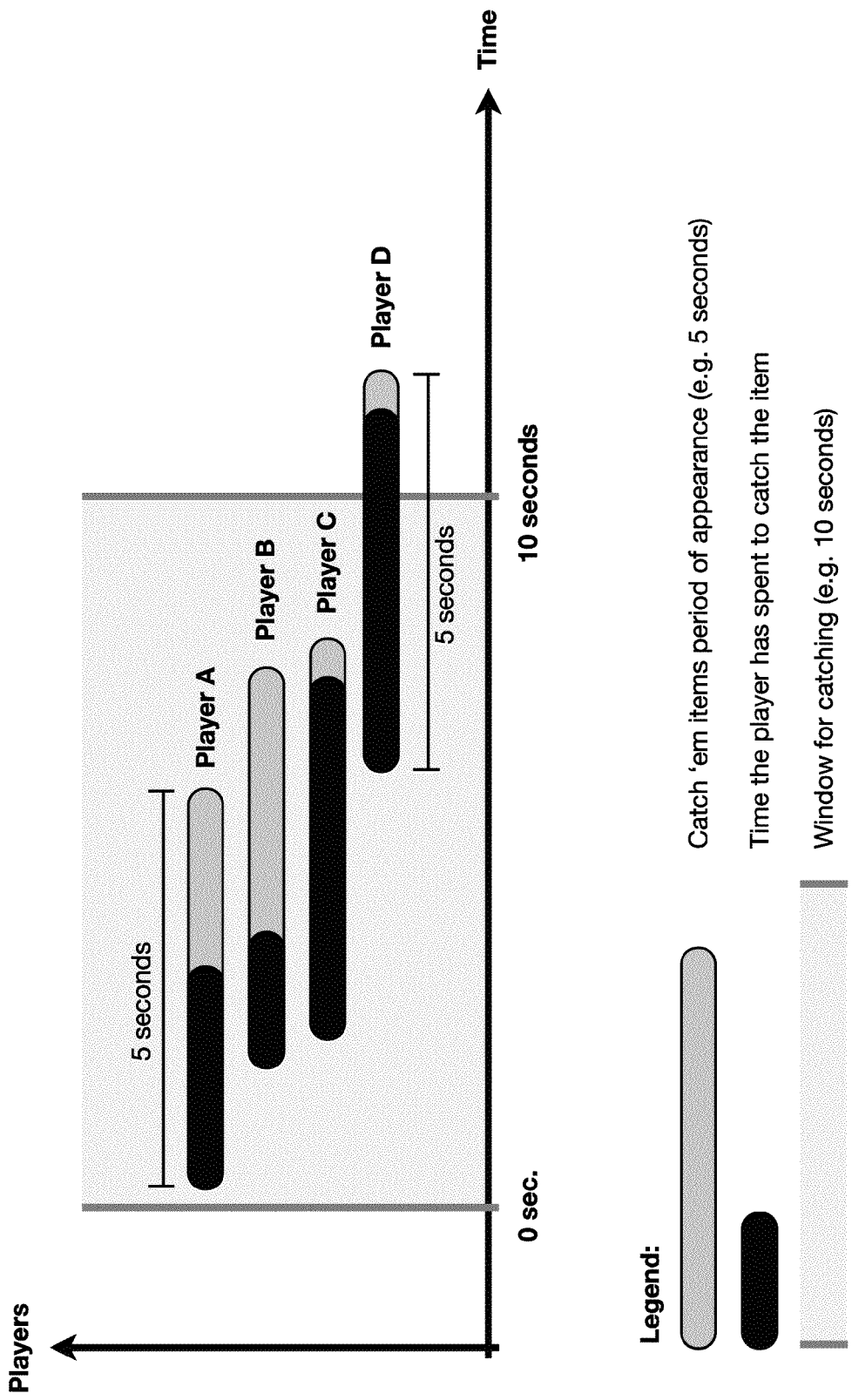
FIG. 3 illustrates exemplary calculations for use with the rewards system of FIG. 1, according to one embodiment.

With reference to FIG. 3, the timing of a rewards game for four players A-D are shown. In this example, players A-D are connected to server 120 as follows: A using Wi-Fi; B using fourth generation (4G) mobile phone communication; C using third generation (3G) mobile phone communication; and D using Enhanced Data rates for Global System for Mobile Communications Evolution (EDGE) technology. As described above, the system administrator may define a predetermined time limit for catching a selected item (e.g., 10 seconds) as well as the duration that the item will be presented on the screen of mobile devices 110 (e.g., 5 seconds). Accordingly, using this example, algorithm 126 defines eligible winners (i.e., by capturing an item within the 5 second presentation window) and criteria for selecting a specific winner (i.e., the eligible winners who have caught the item in the least amount of time and within the predetermined time limit of 10 seconds to account for any network delays).

As soon as the event master (i.e., via event master controls 124) and/or external sources 122 provides the triggering call to start the game, players A-D will have 10 seconds to catch the selected item. However, due to various delays introduced by different data networks 101, the selected item will not appear on the mobile devices 110 of players A-D at the same time. Nevertheless, as illustrated, the selected item will be presented on the screen of mobile devices 110 for the full 5 second range. In order to account for any network delays, the 10 second window for catching the item is greater than the 5 second presentation window in order to minimize any transmission delay. In this example, players A-C have each caught the item within the allotted 5 seconds that the item is present as this 5 second duration does not begin until the selected item is displayed on the screen of the respective mobile device 110. Unfortunately, although the player D caught the item within the 5 second display period, the catch will not register as the window for catching the item has elapsed. Accordingly, if the rules dictate that the player catching the selected item in the shortest period within the predetermined time limit, player B will earn the reward for spending the least amount of time and submitting a valid entry.

Figure 4:
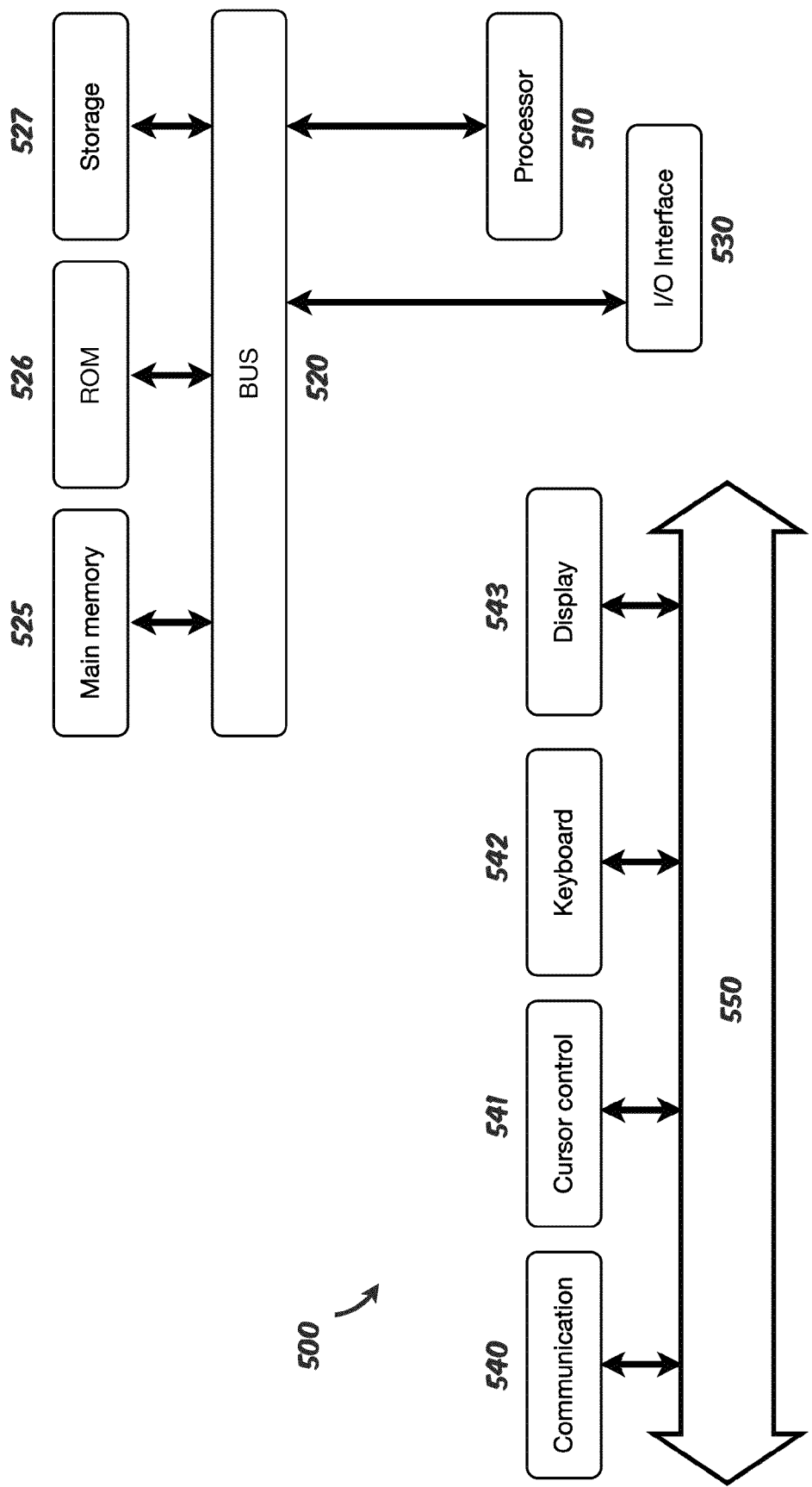
FIG. 4 illustrates an exemplary computer architecture for use with the present rewards system of FIG. 1, according to one embodiment.

As previously mentioned, FIG. 4 illustrates an exemplary computer architecture 500 for use with the rewards system 100, according to one embodiment. One embodiment of architecture 500 comprises a system bus 520 for communicating information, and a processor 510 coupled to bus 520 for processing information. Architecture 500 further comprises a random access memory (RAM) or other dynamic storage device 525 (referred to herein as main memory), coupled to bus 520 for storing information and instructions to be executed by processor 510. Main memory 525 also may be used for storing temporary variables or other intermediate information during execution of instructions by processor 510. Architecture 500 also may include a read only memory (ROM) and/or other static storage device 526 coupled to bus 520 for storing static information and instructions used by processor 510.

A data storage device 527 such as a magnetic disk or optical disc and its corresponding drive may also be coupled to computer system 500 for storing information and instructions. Architecture 500 can also be coupled to a second I/O bus 550 via an I/O interface 530. A plurality of I/O devices may be coupled to I/O bus 550, including a display device 543, an input device (e.g., an alphanumeric input device 542 and/or a cursor control device 541).

The communication device 540 allows for access to other computers (servers or clients) via a network. The communication device 540 may comprise one or more modems, network interface cards, wireless network interfaces or other well known interface devices, such as those used for coupling to Ethernet, token ring, or other types of networks.

FIG. 5 illustrates an exemplary screenshot of the rewards program on the mobile device 110. In this screenshot, three items (e.g., a hamburger, a medal, and a bottle cap) are presented for capture as a separate layer of the user interface. During the rewards sequence, these items are moving over the screen of mobile device 110 when the items are triggered and can be selected (e.g., a user 110 tapping on a selected item).

In the description above, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

A system and method for live action rewards have been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

What is claimed is:

1. A computer-implemented method for providing electronic rewards based on real-time broadcasting events presented on a display, comprising:

displaying content presented on a user interface of one or more user devices being separate from the display, and wherein the content relates to the real-time broadcasting events;

in response to an occurrence in the real-time broadcasting event, displaying a contextual object representative of a reward within the content for a predetermined time period;

receiving a trigger input, the trigger input representative of the contextual object being selected on the user devices; and rewarding a selected user device for selecting the contextual object during the predetermined time period based on a set of predefined rewards rules.

2. The computer-implemented method of claim 1, wherein said displaying a contextual object further comprises receiving a triggering call based on a set of predefined triggering conditions representative of the occurrence in the real-time broadcasting event.

3. The computer-implemented method of claim 2, wherein the triggering call is received from an external source.

4. The computer-implemented method of claim 1, wherein the real-time broadcasting events are selected from a group consisting of sporting events, political debates, television shows, and dramas.

5. The computer-implemented method of claim 1, wherein the user devices are selected from a group consisting of mobile telephones, smart phones, tablet computers, laptops, personal digital assistants and video game consoles.

6. The computer-implemented method of claim 1, wherein the triggering input is selected from a group consisting of clicking a mouse, tapping a touch screen device, and circling the contextual object.

7. The computer-implemented method of claim 1, wherein the set of predefined rewards rules includes a-predetermined time limit being greater than the predetermined time period and counting down in response to an occurrence in the real-time broadcasting event independent of said displaying.

8. The computer-implemented method of claim 7, wherein said rewarding the selected user device is also for selecting the contextual object within the predetermined time limit.

9. The computer-implemented method of claim 1, further comprising notifying the user devices of the selected user device receiving the reward.

10. An electronic rewards system for delivering rewards to one or more user devices over a data network based on real-time broadcasting events, comprising:

a trigger system in communication with the user devices over the data network for displaying a layer over electronic broadcasting content presented on a user interface of the user devices, the electronic broadcasting content relating to the real-time broadcasting events, and for displaying a contextual object representative of a reward within the layer for a predetermined time period in response to an occurrence in the real-time broadcasting event, wherein the user device is a tablet or smart phone; and a results system for receiving a trigger input from the user devices, the trigger input representative of the contextual object being selected on the user devices, and for rewarding a selected user device for selecting the contextual object during the predetermined period based on a set of predefined rewards rules.

11. The electronic rewards system of claim 10, wherein said trigger system further comprises event master controls for receiving a triggering call based on a set of predefined triggering conditions representative of the occurrence in the real-time broadcasting event.

12. The electronic rewards system of claim 10, wherein said trigger system is further configured for receiving a triggering call based on a set of predefined triggering conditions representative of the occurrence in the real-time broadcasting event from an external source.

13. The electronic rewards system of claim 10, wherein the real-time broadcasting events are selected from a group consisting of sporting events, political debates, television shows, and dramas.

14. The electronics rewards system of claim 10, wherein the user devices are selected from a group consisting of mobile telephones, smart phones, tablet computers, laptops, personal digital assistants and video game consoles.

15. The electronic rewards system of claim 10, wherein the triggering input is selected from a group consisting of clicking a mouse, tapping a touch screen device, and circling the contextual object.

16. The electronic rewards system of claim 10, wherein the set of predefined rewards rules includes a predetermined time limit being greater than the predetermined time period and counting down in response to an occurrence in the real-time broadcasting event independent of said displaying.

17. The electronic rewards system of claim 16, wherein said rewarding the selected user device is also for selecting the contextual object within the predetermined time limit.

18. The electronic rewards system of claim 10, wherein said results system is further configured for notifying the user devices of the selected user device receiving the reward.

\* \* \* \* \*